(12) United States Patent
Chen

(10) Patent No.: US 7,449,839 B1
(45) Date of Patent: Nov. 11, 2008

(54) STRUCTURE OF LED LIGHTING CHAIN

(76) Inventor: Ching-Chao Chen, No. 511, Sec. 3, Dong Ta Rd., Hsinchu City (TW)

( * ) Notice: Subject to any disclaimer, the term of this patent is extended or adjusted under 35 U.S.C. 154(b) by 52 days.

(21) Appl. No.: 11/651,612

(22) Filed: Jan. 10, 2007

(51) Int. Cl.
H05B 37/00 (2006.01)

(52) U.S. Cl. ............... 315/200 A; 315/200 R; 315/185 S; 315/205; 315/312

(58) Field of Classification Search ............ 315/200 R, 315/200 A, 205–207, 185 S, 185 R, 312
See application file for complete search history.

(56) References Cited

U.S. PATENT DOCUMENTS 6,972,528 B2 * 12/2005 Shao ................. 315/185 R
7,250,730 B1 * 7/2007 Allen ................. 315/185 R
7,265,496 B2 * 9/2007 Allen ................. 315/185 R

* cited by examiner

Primary Examiner—Tuyet Vo
(74) Attorney, Agent, or Firm—Troxell Law Office, PLLC

(57) ABSTRACT

A LED lighting chain is disclosed to include a front plug, a rear plug, an AC-DC converter formed of four rectifying diodes, and a LED serial set, wherein the LED serial set has a voltage dropping device formed of a resistance and two capacitors so arranged that changing the resistance and capacitors relatively changes the voltage of the LED serial set, and therefore increasing the number of LEDs does not change the brightness of the LED serial set. Further, a resistance is connected in parallel to each capacitor of the voltage dropping device so that when power is off, residual electric energy is discharged out of the capacitors to ensure safety of the LED lighting chain and to prevent damage to the LEDs during start.

2 Claims, 3 Drawing Sheets

STRUCTURE OF LED LIGHTING CHAIN

BACKGROUND AND SUMMARY OF THE INVENTION

The present invention relates to decorative lighting chains and more particularly, to an improved structure of LED lighting chain, which provides a constant brightness that is free from the limitation of the number of LEDs and, which is safe and durable in use.

FIG. 1 is a schematic circuit diagram of a conventional decorative lighting chain. According to this prior art design, the decorative lighting chain comprises a front plug 61, a rear plug 62, an AC-DC converter 7, and at least one LED serial set 8. Each LED serial set 8 is comprised of a plurality of LEDs connected in series. A power cable is installed to connect the positive and negative terminals of the front plug 61 and the rear plug 62. The AC-DH converter 7 is connected in parallel to the power cable. Referring also to FIG. 2, the AC-DC converter 7 is a bridge rectifier having four wires 91, 92, 93 and 94. Due to the limitation of the four wires 91, 92, 93 and 94 of the AC-DC converter 7, the decorative lighting chain is less attractive. Further, the LED serial set 8 is not provided with a voltage dropping device to stabilize the voltage at the two ends of the LED serial set 8. Because the rated voltage of a regular LED is 2.2V, the number of LEDs of the LED serial set 8 is limited.

U.S. Pat. No. 6,972,528B2 uses only three wires, thereby having a better sense of beauty. Further, this design has a voltage-reducing device, which comprises a resistor in series with a capacitor. By means of selecting a different resistance value, the voltage-reducing device fits a different number of LEDs. However, this structure for LED lighting chain still has drawbacks as follows:

1. Because this structure of LED lighting chain works at a constant voltage working, its input voltage range is limited. When working at AC 120V, the number of the LEDs must not exceed by 60, otherwise the brightness will be insufficient.

2. It adopts built-in resistance load to fit different LED serial sets of different numbers of LEDs, resulting high consumption of load power and low efficiency.

3. It causes a high voltage pulse during operation, and the LEDs may be damaged easily during the starting transient.

4. The working stability of this structure of LED lighting chain is low. Further, the LED lighting chain tends to be interfered with external noises, and the control of its LED brightness is not easy.

The present invention has been accomplished under the circumstances in view. According to one aspect of the present invention, the LED lighting chain has a resistance and two capacitors installed in the LED serial set thereof to constitute a voltage dropping device. By means of changing the capacitors and the resistance, the voltage of the LED serial set is relatively changed, i.e., increasing the number of the LEDs does not change the brightness of the LED serial set. According to another aspect of the present invention, a resistance is connected in parallel to each capacitor of the voltage dropping device, so that when power is off, residual electric energy is discharged out of each capacitor to assure safety use of the LED lighting chain. According to still another aspect of the present invention, when starting the LED lighting train, the electric current is stable. Even if a transient high voltage is produced due to an electronic shock, the voltage will soon be stabilized, preventing damage to the LEDs, and therefore the working life of each LED is prolonged.

DETAILED DESCRIPTION OF THE INVENTION

Figure 1:
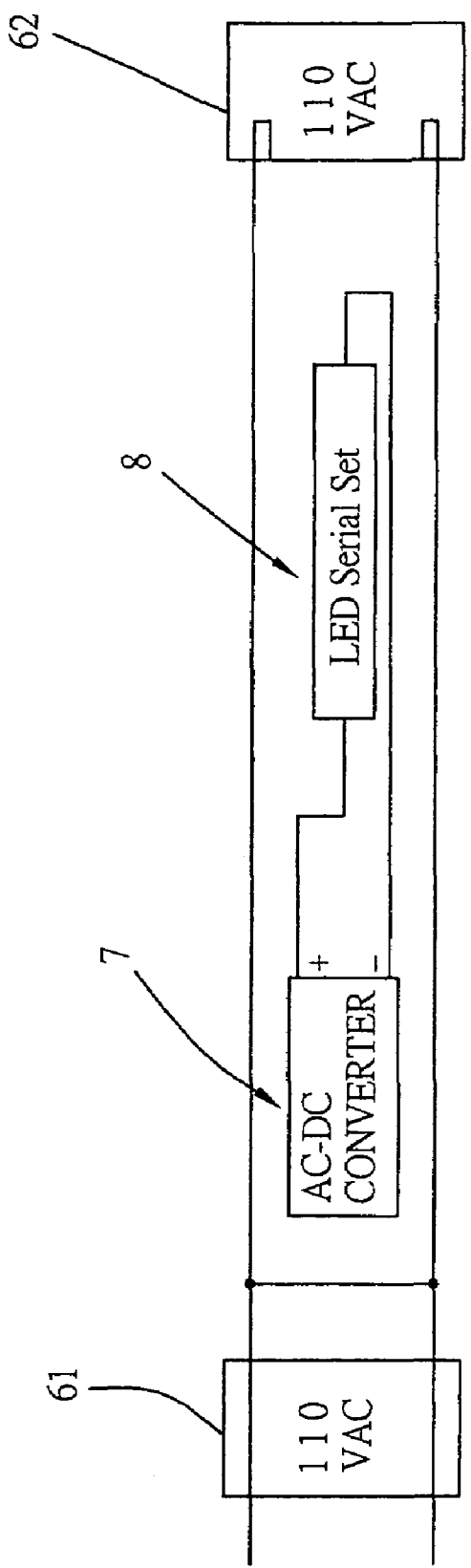
FIG. 1 is the prior art schematic circuit diagram of conventional decorative lighting chain.
Figure 2:
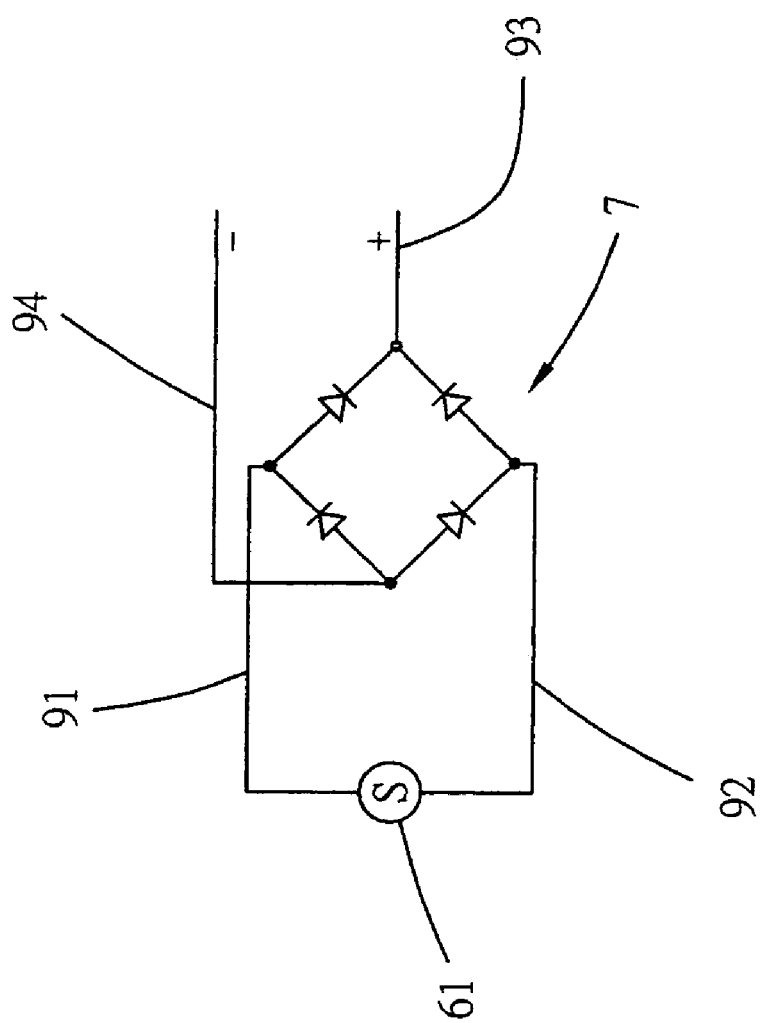
FIG. 2 is the prior art schematic circuit diagram of the AC-DC converter illustrated in FIG. 1.
Figure 3:
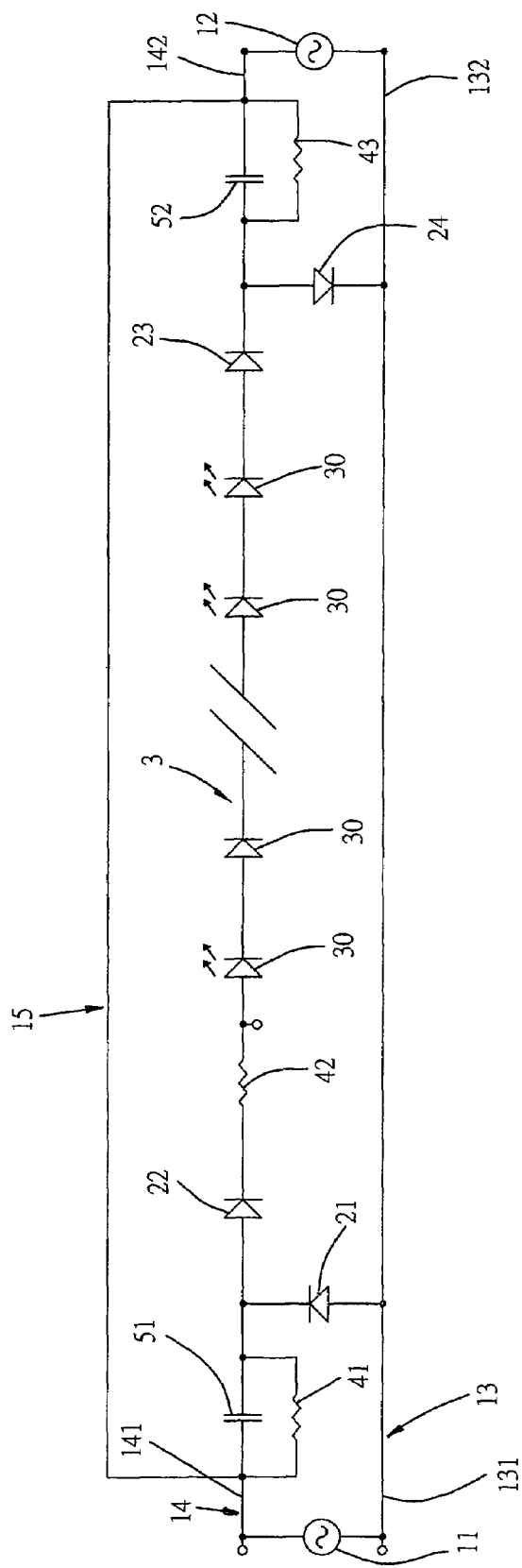
FIG. 3 is a schematic circuit diagram illustrating a simplified method of connecting an LED lighting chain, in accordance with an embodiment of the present invention.

Referring to FIG. 3, a LED lighting chain in accordance with the present invention is shown comprising a front plug 11, a rear plug 12, an AC-DC converter formed of four rectifying diodes 21~24, and at least one LED serial set 3. When multiple LED serial sets 3 are installed, they are connected in parallel. As shown in FIG. 3, the four rectifying diodes 21~24 are arranged into two sets, namely, the first set of rectifying diodes 21 and 22 and the second set of rectifying diodes 23 and 24, wherein one rectifying diode 21 of the first set of rectifying diodes 21 and 22 has its negative terminal electrically connected to the positive terminal of the other rectifying diode 22 of the first set of rectifying diodes 21 and 22 and its positive terminal electrically connected to one end 131 of one wire 13 of the front plug 11; the other rectifying diode 22 of the first set of rectifying diodes 21 and 22 has its negative terminal electrically connected to the positive terminal of each LED serial set 3 through a resistance 42 of each LED serial set 3; the two rectifying diodes 21 and 22 of the first set of rectifying diodes 21 and 22 have their common terminals respectively connected to one end 141 of the other wire 14 of the front plug 11 through a capacitor 51 of each LED serial set 3; one rectifying diode 23 of the second set of rectifying diodes 23 and 24 has its negative terminal electrically connected to the positive terminal of the other rectifying diode 24 of the second set of rectifying diodes 23 and 24 and its positive terminal electrically connected the negative terminal of each LED serial set 3; the other rectifying diode 24 of the second set of rectifying diodes 23 and 24 has its negative terminal electrically connected to the opposite end 132 of one wire 13 of the front plug 11; the two rectifying diodes 23 and 24 of the second set of rectifying diodes 23 and 24 have their common terminals respectively connected to the opposite end 141 of the other wire 14 of the front plug 11 through a capacitor 52 of each LED serial set 3.

The resistance 42 and capacitors 51 and 52 that are connected in series to the at least one LED serial set 3 constitute a voltage dropping device. By means of changing the capacitors 51 and 52 and the resistance 42, the voltage of the at least one LED serial set 3 is relatively changed, i.e., the number of the LEDs 30 can be adjusted.

Further, a resistance 41 is connected in parallel to the capacitor 51 between the common terminals of the two rectifying diodes 21 and 22 of the first set of rectifying diodes 21 and 22 and one end 141 of the other wire 14 of the front plug 11, and a resistance 43 is connected in parallel to the capacitor 52 between the common terminals of the two rectifying diodes 23 and 24 of the second set of rectifying diodes 23 and 24 and the other end 142 of the other wire 14 of the front plug 11. Therefore, when power is off, residual electric energy is discharged out of the capacitors 51 and 52, assuring safety use of the LED lighting chain.

Further, the position of the first set of rectifying diodes 21 and 22 and the position of the second set of rectifying diodes 23 and 24 may be exchanged. In this case, the positive terminal and negative terminal of each LED serial set 3 must be reversed.

According to the aforesaid arrangement, the AC-DC converter of the LED lighting chain of the present invention also requires only three wires 13, 14 and 15.

In general, the invention has the following advantages:

1. The resistance 42 and capacitors 51 and 52 of each LED serial set 3 constitute a voltage dropping device. By means of changing the capacitors 51 and 52 and the resistance 42, the voltage of the at least one LED serial set 3 is relatively changed, i.e., the number of the LEDs 30 can be adjusted, and increasing the number of the LEDs 30 does not change the brightness of the LED lighting chain.

2. A resistance 41 is connected in parallel to the capacitor 51 of the voltage dropping device, and a resistance 43 is connected in parallel to the capacitor 52 of the voltage dropping device. Therefore, when power is off, residual electric energy is discharged out of the capacitors 51 and 52, assuring safety use of the LED lighting chain.

3. When starting the LED lighting train, the electric current is stable. Even if a transient high voltage is produced due to an electronic shock, the voltage will soon be stabilized, preventing damage to the LEDs, and therefore the working life of each LED is prolonged.

What is claimed is:

1. A LED lighting chain comprising a front plug, a rear plug, a first wire and a second wire connected in parallel between said front plug and said rear plug, an AC-DC converter formed of four rectifying diodes, and at least one LED serial set, wherein said four rectifying diodes includes a first rectifying diode, a second rectifying diode, a third rectifying diode, and a fourth rectifying diode, said first rectifying diode and said second rectifying diode constituting a first set of rectifying diode, said fourth rectifying diode and said third rectifying diode constituting a second set of rectifying diode; said first rectifying diode has the negative terminal thereof electrically connected to the positive terminal of said second rectifying diode and the positive terminal thereof electrically connected to a first end of said first wire; said second rectifying diode has the negative terminal thereof electrically connected to a resistance at the positive terminal of said at least one LED serial set through, said first rectifying diode and said second rectifying diode have the common terminals thereof electrically connected to a first end of said second wire through a capacitor of said at least one LED serial set; said third rectifying diode has the negative terminal thereof electrically connected to the positive terminal of said fourth rectifying diode and the positive terminal thereof electrically connected the negative terminal of said at least one LED serial set; said fourth rectifying diode has the negative terminal thereof electrically connected to a second end of said first wire; said third rectifying diode and said fourth rectifying diode have the common terminals thereof respectively connected to a second end of said second wire through a capacitor of said at least one LED serial set; the resistance and capacitors that are connected in series to said at least one LED serial set constitute a voltage dropping device.

2. The LED lighting chain as claimed in claim 1, wherein a resistance is connected in parallel to the capacitor between the common terminals of said first rectifying diode and said second rectifying diode and the first end of said second wire, and a resistance is connected in parallel to the capacitor between the common terminals of said third rectifying diode and said fourth rectifying diode and the second end of said second wire, so that when power is off, residual electric energy is discharged out of the capacitors.

* * * * *